(12) United States Patent
Pugliese

(10) Patent No.: US 7,386,101 B2
(45) Date of Patent: Jun. 10, 2008

(54) SYSTEM AND METHOD FOR CALL ANSWER DETERMINATION FOR AUTOMATED CALLING SYSTEMS

(75) Inventor: Jeff Pugliese, Huntersville, NC (US)

(73) Assignee: Intervoice Limited Partnership, Dallas, TX (US)

( * ) Notice: Subject to any disclaimer, the term of this patent is extended or adjusted under 35 U.S.C. 154(b) by 414 days.

(21) Appl. No.: 10/409,663

(22) Filed: Apr. 8, 2003

(65) Prior Publication Data
US 2004/0202293 A1 Oct. 14, 2004

(51) Int. Cl.
*H04M 1/64* (2006.01)
(52) U.S. Cl. .......................... 379/69; 704/251
(58) Field of Classification Search ............ 379/88.01, 379/88.16, 69, 67.1, 92.03, 88.23, 88.19, 379/231, 88.18; 704/270, 251, 88.19, 231
See application file for complete search history.

(56) References Cited

U.S. PATENT DOCUMENTS

| | | | |
|---|---|---|---|
| 4,356,348 A | 10/1982 | Smith | |
| 4,405,833 A | 9/1983 | Cave et al. | |
| 4,640,990 A | 2/1987 | Kawade et al. | |
| 4,696,031 A | 9/1987 | Freudberg et al. | |
| 4,941,168 A * | 7/1990 | Kelly, Jr. ..................... | 379/69 |
| 4,979,214 A | 12/1990 | Hamilton | |
| 5,023,906 A | 6/1991 | Novas | |
| 5,241,584 A | 8/1993 | Hardy et al. | |
| 5,311,588 A | 5/1994 | Polcyn et al. | |
| 5,371,787 A | 12/1994 | Hamilton | |
| 5,425,091 A | 6/1995 | Josephs | |
| 5,546,442 A | 8/1996 | Foladare et al. | |
| 5,661,790 A | 8/1997 | Hsu | |
| 5,671,272 A | 9/1997 | Cotreau | |
| 5,982,858 A | 11/1999 | Carter et al. | |
| 6,208,970 B1 * | 3/2001 | Ramanan ..................... | 704/270 |
| 6,226,360 B1 * | 5/2001 | Goldberg et al. ............. | 379/69 |
| 6,321,194 B1 | 11/2001 | Berestesky | |
| 6,470,077 B1 * | 10/2002 | Chan ....................... | 379/88.01 |
| 6,483,897 B1 | 11/2002 | Millrod | |
| 6,546,097 B1 * | 4/2003 | Peltz ..................... | 379/265.07 |
| 6,683,943 B2 * | 1/2004 | Wuelly .................... | 379/93.13 |
| 6,925,166 B1 * | 8/2005 | Chan ..................... | 379/265.02 |
| 2002/0051522 A1 * | 5/2002 | Merrow et al. .......... | 379/88.01 |
| 2002/0085686 A1 * | 7/2002 | Cullis ........................ | 379/67.1 |
| 2003/0086541 A1 * | 5/2003 | Brown et al. ............ | 379/88.01 |
| 2003/0185352 A1 * | 10/2003 | Savage et al. ............. | 379/67.1 |
| 2004/0037397 A1 * | 2/2004 | Roby ....................... | 379/88.01 |

FOREIGN PATENT DOCUMENTS

WO WO 98/52340 * 11/1998

OTHER PUBLICATIONS

International Search Report issued for PCT/US2004/10623, dated Feb. 28, 2005.

* cited by examiner

*Primary Examiner*—Olisa Anwah
(74) *Attorney, Agent, or Firm*—Fulbright & Jaworski LLP

(57) ABSTRACT

There is disclosed an automatic calling system which analyzes the contents of detected voice on a called line and controls the operation of the calling system dependent upon the analyzed context. In one embodiment, the content is analyzed based on typically expected grammars, at least some of which may be unique to the called party. In another embodiment, upon answer detection, the called party is probed, for example by playing one or more messages, and action is taken dependent upon analyzed responses from the called line.

30 Claims, 3 Drawing Sheets

SYSTEM AND METHOD FOR CALL ANSWER DETERMINATION FOR AUTOMATED CALLING SYSTEMS

TECHNICAL FIELD

The present invention is directed to automated outbound calling systems and more specifically to systems and methods for call answer determination for automated outbound calling systems.

BACKGROUND

It has become common practice for businesses to place automated telephone calls in order to deliver messages to phone subscribers at called locations, such as telephones. Over the years, these automated systems have had to become more and more sophisticated, particularly because of the increasing complexity of the telephone network. In the early days of automated calling, when the called telephone started to ring (after ringing was detected) the automated system began playing the desired message. This message was played over and over and over again until either an answering machine received it or the called party, after hearing the message, hung up. One problem was that the automated calling system did not know if the message was delivered, and if delivered, did not know if a live person actually received the message. Such systems could not distinguish between a live answer or an answering machine.

Numerous systems have been directed to answer supervision and detection. Some of these are U.S. Pat. No. 4,405,833, Cave, et al., issued Sep. 20, 1983, entitled "Telephone Call Progress Tone and Answer Identification Circuit," U.S. Pat. No. 4,696,031, Freudberg, et al., issued Sep. 22, 1987, entitled "Signal Detection and Discrimination Using Waveform Peak Factor," U.S. Pat. No. 4,979,214, Hamilton, issued Dec. 18, 1990, entitled "Method and Apparatus For Identifying Speech in Telephone Signals," U.S. Pat. No. 5,311,588, Polcyn, et al., issued May 10, 1994, entitled "Call Progress Detection Circuitry and Method," U.S. Pat. No. 5,371,787, Hamilton, issued Dec. 6, 1994, entitled "Machine Answer Detection," U.S. Pat. No. 5,671,272, Cotreau, issued Sep. 23, 1997, entitled "Current Mode Ring Trip Detector," U.S. Pat. No. 5,241,584, Hardy, et al., issued Aug. 31, 1993, entitled "Response Time Evaluation Unit," U.S. Pat. No. 6,483,897, Millrod, issued Nov. 19, 2002, entitled "Method and Apparatus for Answering a Telephone with Speech," U.S. Pat. No. 6,321,194, Berestesky, issued Nov. 20, 2001, entitled "Voice Detection in Audio Signals," U.S. Pat. No. 5,023,906, Novas, issued Jun. 11, 1991, entitled "Method for Monitoring Telephone Call Progress," U.S. Pat. No. 4,640,990, Kawade, et al., issued Feb. 3, 1987, entitled "Telephone Answering Apparatus Having Two Integrators of Different Time Constants," and U.S. Pat. No. 4,356,348, Smith, issued Oct. 26, 1982, entitled "Techniques for Detecting a Condition of Response on a Telephone Line." In addition, many systems have been directed to automated call generation. Some of these are U.S. Pat. No. 5,982,858, Carter, et al., issued Nov. 9, 1999, entitled "System for Providing Automatic Voice Messaging in a Digital Network Environment," U.S. Pat. No. 5,661,790, Hsu, issued Aug. 26, 1997, entitled "Call Back Service for a Regulatory Restrictive Area," U.S. Pat. No. 5,546,442, Foladare, et al., issued Aug. 13, 1996, entitled "Method and Apparatus for Use in Completing Telephone Calls," and U.S. Pat. No. 5,425,091, Josephs, issued Jun. 13, 1995, entitled "Method and System for Providing an Automatic Customer Callback Service." Theses patents are representation of the systems available and not an exhaustive list.

Prior to answering machines it was relatively easy to know if a live person answered. A call was either in a network processing state (ringing or busy) or in an answered state, and without answering machines an "answered" call had to be live. As soon as voice was detected, the message was played. Voice was determined using several techniques, some of these included detection of the number of frequencies of the signal being returned from the called line, by the power levels received, or by combinations thereof. Again, if there was any "voice" signal, then it was a live person answering.

As answering machines have become more prevalent, discrimination between live answer and machine answer has become more difficult. Typically, live voice is a short burst, such as "Hello", while an answering machine would deliver a longer message. Thus, algorithms to discriminate between a live answer and a machine answer are typically time based. This works well for home calling, but not so well for situations where a receptionist answers the telephone and says, "Hello, this is XYZ, who do you wish to speak with?", sometimes even working a sales pitch into the greeting. Thus, a timed approach to answer discrimination does not work well in all environments. To know with some degree of certainty whether a call is being answered live or by machine, existing systems fall short.

Another problem with a timed approach to answer discrimination is that when a called party answers the phone there is silence. While the calling system is trying to decide (based on answer greeting length) whether or not a live answer has occurred. From the called party's perspective, there is a silence or pause of varying length, and the called party knows it is a machine calling and often simply hangs up. The caller has said "Hello" and the system is waiting to see if that is the last thing the caller is going to say. The system looks for the ½ to 1 second of silence following the initial greeting. If the automated system "hears" silence following the initial greeting, then it knows that a live person has answered and starts playing it's message.

Some answering systems have interposed an automatic layer between the caller and the called party. Existing systems, because of the length of the message, would determine that this is an answering machine and act accordingly, thereby missing an opportunity to connect for a live person. For example, a call director might answer the can and say, "Please push 1 for John and 2 for Bill".

There are numerous situations where it is important for a calling system to determine if a message has been delivered, and if so, to whom and when. Such systems must also know if the message has been delivered live or if it has been left on an answering device. Systems that cannot accurately discriminate between the various answer scenarios are not useful in such situations.

BRIEF SUMMARY

There is disclosed an automatic calling system which analyzes the contents of detected voice on a calling line using speech recognition techniques and controls the operation of the calling system dependent upon the analyzed context. In one embodiment, the content is analyzed based on typically expected grammars, at least some of which may be unique to the called party. In another embodiment, upon answer detection, one or more interactions may occur, messages are played or touch-tone (DTMF or dual tone multi-frequency) signals are output, and action is taken dependent upon analyzed verbal responses from the called line.

The foregoing has outlined rather broadly the features and technical advantages of the present invention in order that the detailed description of the invention that follows may be better understood. Additional features and advantages of the invention will be described hereinafter which from the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
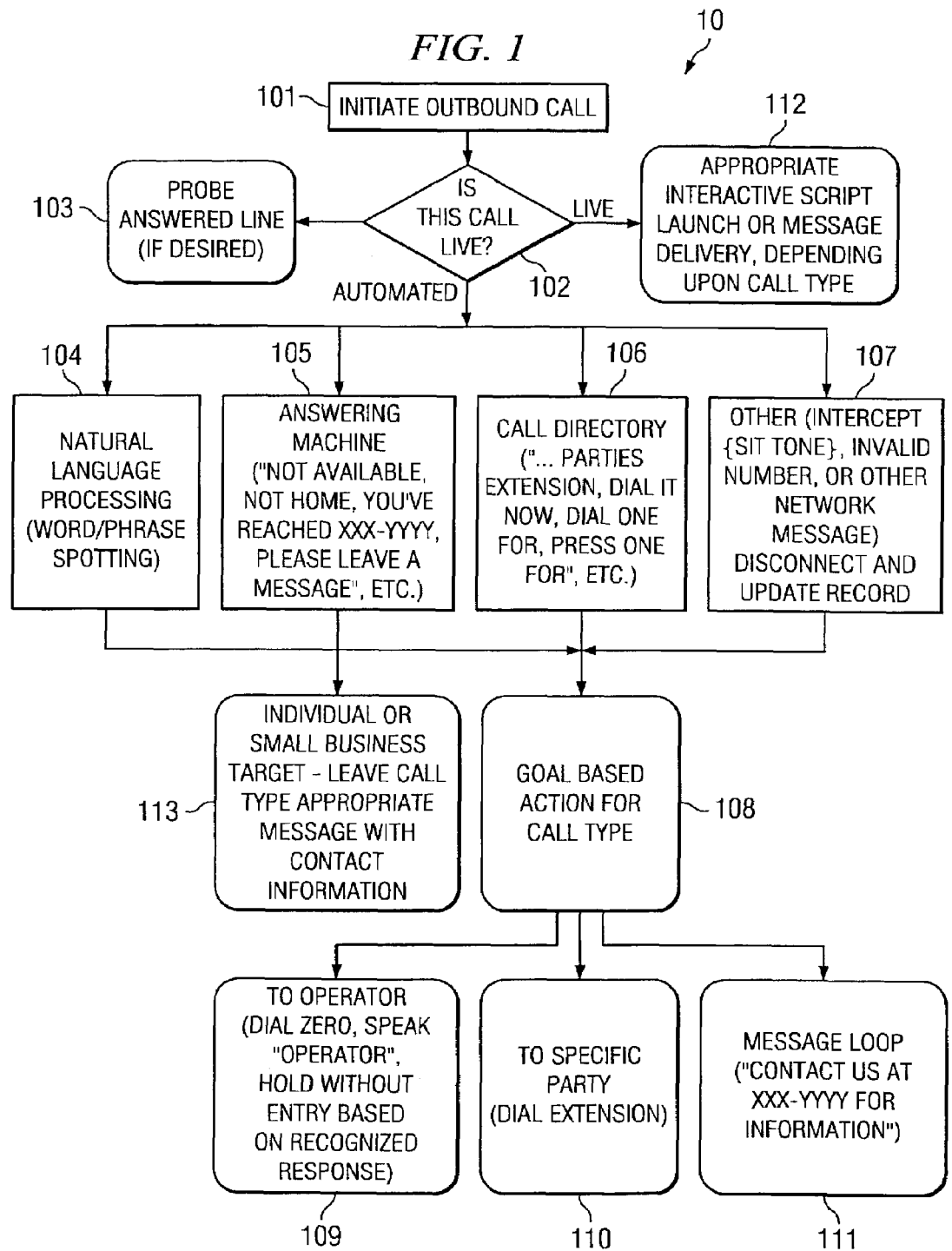
FIG. 1 is an overview of a typical flow chart showing one embodiment.

FIG. 1 shows diagram 10 which is one embodiment of a call flow starting with process 101 which is the initiation of an outbound call from an automatic calling system, such as system 40, FIG. 4. Process 102 determines if the line has answered with a determined live (real-time response) person. One system for making such a determination is process 103, which interrupts the answering party in order to probe that party. The probe would be such so as to elicit a response (such as "Yes" or "No").

As part of this probe, the calling system could retrieve specific information pertaining to the called party. For example, that information could be the called party's name and perhaps other information, such as an order number, delivery code, etc. When answer is detected, whether it be a live person or a machine, a message (probe) is played. This message could be, "This is XYZ calling, we have a delivery for Ms. Smith. Is this Ms. Smith speaking?".

If a live person had answered the call, the typical response would be, "Yes" or "No". Of course, if a machine had answered, its message would continue and if the probe message had been carefully crafted, any response received from a live person should not be the same as would be provided in a prerecorded answering machine message. Recognition of the meaning and/or context of the actual called party response, in either case, is important to the interaction.

If a live answer has been detected, then process the controls on interactive session, or the playing of the desired message.

If, as a result of the interactive speech recognition probe, the calling system cannot be certain that a live person is ready to receive the message, then it may be necessary to use additional speech recognition processes to help identify how the call was, in fact, answered. In such a situation, process 104 helps determine if an answering machine is on line (process 105), or whether a call director (process 106) or other event has occurred. This is accomplished by using predicted grammars to help identify the characteristics of the types of end users (called parties) on the call. Answering machines will say something such as "I am not available," I am not at home, "You've reached phone number ZZZ, please leave a message." Call directors typically say things like, "If you know your party's extension, dial it now or press key YY."

The above phrases are all predefined and when recognized, direct the system to the proper next function, which is to achieve a particular goal as controlled by process 108. If an answering machine type response is determined, process 111 is activated to play the desired message. If the call director says a list of names, those names can be compared to the specific information pertaining to the called line. Thus, if Jane Smith were being called, the calling system could analyze the response from the called line and match the word "Jane" with a desired name. The message could have said, "For Jane press 1, for Mary press 2." The calling system then sends a 1 tone to ring Jane. When an answer is received, process 102 begins again to determine if the call is now being answer live or by Jane's answering (voice message) machine. Using this "probing" technique it is possible to interact with the answering device, perhaps in an interactive mode where several exchanges can take place.

Sometimes, the direction is not to push a key, but rather an extension number is provided. In such a situation, the calling system matches the names it is looking for to the extension number provided, as discussed for process 110, and process 102 again repeats.

Figure 2:
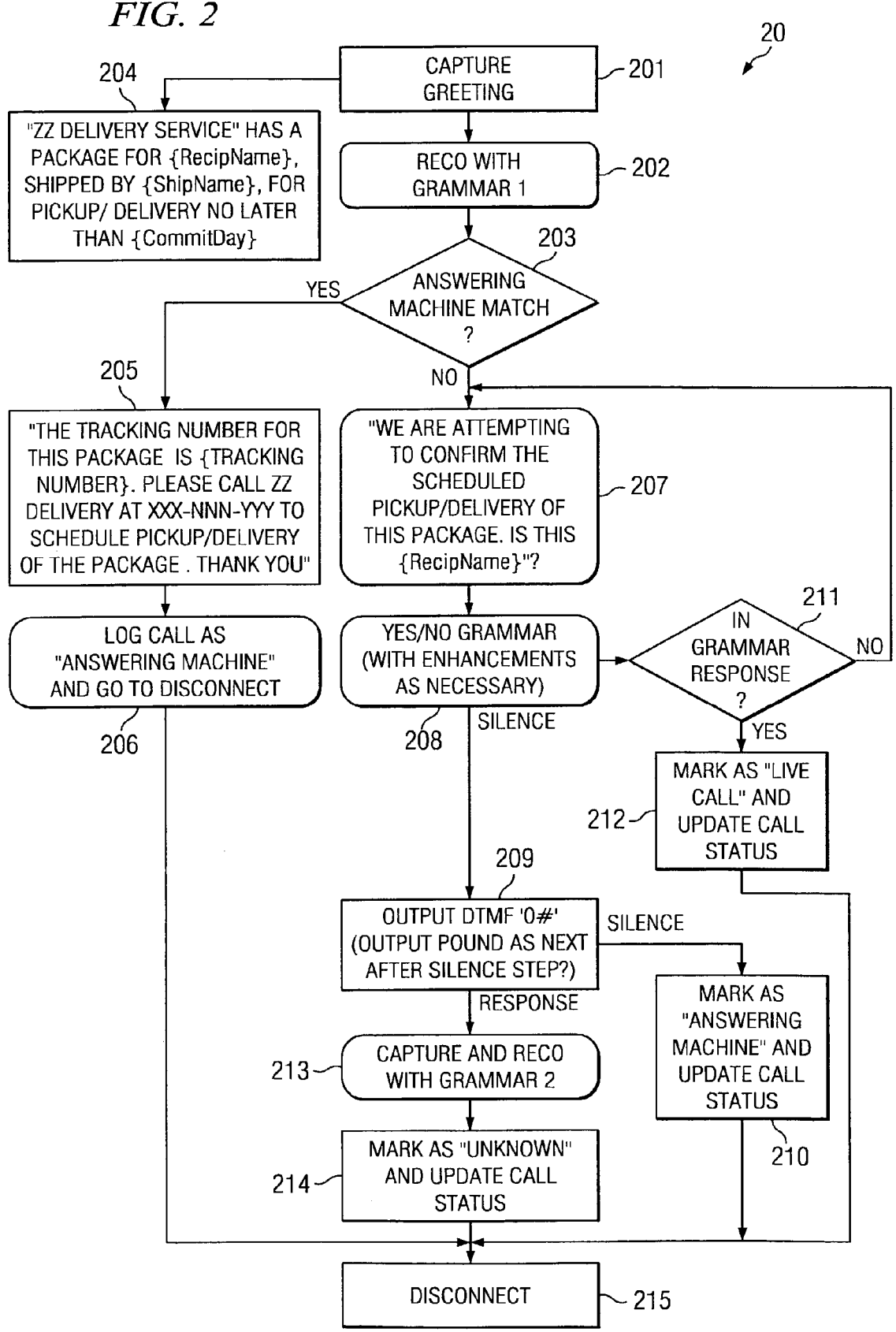
FIG. 2 is a flow chart of an embodiment of system operation.

FIG. 2 shows flow chart 20 which illustrates one example of the use of intelligent design considerations showing multiple grammars being used to determine the eventual delivery of the desired outgoing message. The system, as will be discussed, keeps records of what actually happened on each call. As will be seen, the system does not have a single solution grammar that just tries to capture the first sound to make its decision. The system and method layers the solution based on multiple intelligent steps of interrogation, on a proactive basis to try to illicit a response. This is important regardless of the technology used by the calling system, whether it is the most basic speech recognition or whether it is sophisticated statistical language modeling using word and phrase spotting within a context list environment. For reasonable accuracy, it is important to determine some level of context and this context determination is easier if different approaches are available to the system.

For example, the first layer could be a passive mode where typical words or phrases are used. The next layer could be playing a prompt. The prompt might be a question asking for the person's name, as obtained from a database record when an answer (voice) is detected, the system interrupts and asks, "Is this the home of John Smith at XXX street?". If the answer is "Yes", then the message can be delivered. If the answer is "No", then the system could give the message or just say "I'm sorry", and hang up. If a question comes back, such as, "Who wants to know?", the system could then say "The cab company, a taxi is waiting out front", and wait for a reply. If the answer is not within the expected responses, then the next layer is to try to take into account the broad spectrum of devices that could have answered. Since a path is established and the response was not proper, the system knows it is not live, but is still not sure if it is an answering machine or some other automated device. One action is to play DTMF tones because almost every system, other than passive answering machines, have multiple goals that can be activated through touch tones. Once the touch tones are played, there is another grammar that could be used based on the context of the DTMF that was played. The system could have multiple grammars for the different DTMF tones zero through 9. These grammars are based on typical responses generated for different tones. Thus, typical to dialing zero, an operator would be expected to answer. While transferring to an operator, most systems usually give status information, such as, "Please hold while I transfer you to the operator", or it will say that the transfer option is not available, or "I'm sorry, we cannot transfer you", or "It is after hours, call back in the morning".

The important thing is that it is often critical to get the message delivered and know it was delivered. It could be a package that needs to be picked up; a doctor trying to get a call back, or any number of important messages that must be delivered. So, there are really several goals, one of which is to make the identification of how the call was answered. However, the ultimate goal is to deliver the message and to verify that the message actually was delivered and to whom (or to what) it was delivered. It is important for the calling system to not have to call again. The whole idea is that there are a huge number of these calls going out every day and instead of having operators lined up to make the calls, the automated system could perform this function. It is also important for the system to know how the message was delivered because the customer will inevitably call and complain that he/she was never told about a package (or about the waiting cab, or dental appointment, etc) and the originator then must be able to tell the customer exactly what was said, including the date and the delivery mode.

Continuing in FIG. 2, process 201 captures the calling line greeting and using grammar 1, process 202 determines if it is an answering machine 203. At the same time, process 204 is playing a message. If it is an answering machine, message 204 will be recorded and additional timing and message loop processes may be employed to ensure that information is appropriately delivered. There are probably a number of different algorithms that could be used in interacting with, and determining what, person or device answered at the target destination. If it is a live person, that person will hear the message, and typically say something that would be interpreted by the calling system process 211 as a live response. The system then switches to live response mode, such as shown by process 205, and process 212 marks the call as live answer. If grammar 202 determines that it is an answering machine, process 205 give information for additional recording on the machine, if desired, process 206 logs the call and disconnects (215).

If it is not an answering machine, then process 207 continues the monologue by giving more information and prompting to select a response. Process 208, using predetermined grammars, waits for a "known" response.

Processes 209, 210, 213, and 214 are self-explanatory as discussed above.

Below are two grammar charts. Grammar 1 is an example of a passive grammar and grammar 2 is an example of an active grammar based on sending a DTMF "0". These grammars are a sample of beginning grammars, and should not be construed as being the actual grammars used. Speech grammars are continually tuned and optimized for performance based on the expanding number of utterances that are captured by the recognition engine. In addition, other grammars might be created and used for initial call answers, or where different DTMF outputs are made (1, 2, 3, 4 . . . 9) based on ongoing analysis of which outputs best constrain the context for matching a response within the grammar.

| Grammar 1 | |
|---|---|
| Grammar | Status |
| You have reached our automated system | Unknown |
| If you would like to use our automated System | Unknown |
| If you would like to use your touchtone keypad | Unknown |
| If you wish to use our automated system | Unknown |
| If you wish to use your touchtone keypad | Unknown |
| For automated account information press 1 | Unknown |
| Our business hours are from | Unknown |
| One moment please while I transfer you to an operator | Unknown |
| Please wait while I transfer your call | Unknown |
| Please wait while I transfer you to an operator | Unknown |
| Please hold while I transfer you to an operator | Unknown |
| Please stay on the line while I transfer you to an operator | Unknown |
| Please remain on the line while I transfer you to an operator | Unknown |
| One moment please while I transfer you to the front desk | Unknown |
| Please wait while I transfer you to the front desk | Unknown |
| Please hold while I transfer you to the front desk | Unknown |
| Please stay on the line while I transfer you to the front desk | Unknown |
| Please remain on the line while I transfer you to the front desk | Unknown |
| Please hold for the Operator | Unknown |
| Please hold for the Attendant | Unknown |
| If you know the extension you wish to reach [please] dial it now | Unknown |
| If you know your party's extension [please] dial it now | Unknown |
| You may dial your parties extension now | Unknown |
| If you know your Party's extension [please] enter it now | Unknown |
| How can I direct your call | Unknown |
| How may I direct your call | Unknown |
| Please leave a [short/brief] message | AnsMachine |
| Please leave a [short/brief] message at the beep | AnsMachine |
| Please leave a [short/brief] message at the tone | AnsMachine |
| Please leave your number | AnsMachine |
| Please leave your number at the beep | AnsMachine |
| Please leave your number at the tone | AnsMachine |
| Please leave your name and number | AnsMachine |
| Please leave your name and number at the beep | AnsMachine |
| Please leave your name and number at the tone | AnsMachine |
| I'm [sorry I'm] unable to take your call | AnsMachine |
| We're [sorry we're] unable to take your call | AnsMachine |
| I'm [sorry I'm] not available to take your call | AnsMachine |
| We're [sorry we're] not available to take your call | AnsMachine |
| I'm not at home right now | AnsMachine |
| We're not at home right now | AnsMachine |
| I can't take your call right now | AnsMachine |
| We can't take your call right now | AnsMachine |
| We're busy right now and can't take your call | AnsMachine |
| I'm busy right now and can't take your call | AnsMachine |
| I'll get back to you as soon as I return | AnsMachine |
| I'll get back to you as soon as I can | AnsMachine |
| We'll get back to you as soon as we return | AnsMachine |
| We'll get back to you as soon as we can | AnsMachine |
| We'll call you back | AnsMachine |
| I'll call you back | AnsMachine |
| You've reached the voicemail of | AnsMachine |

Grammar 2

| Grammar | Status |
|---|---|
| [I'm sorry] There is no attendant available | Unknown |
| [I'm sorry] There is no attendant available at this time | Unknown |
| [I'm sorry] There is no operator available | Unknown |
| [I'm sorry] There is no operator available at this time | Unknown |
| [I'm sorry] No one is available to take your call right now | Unknown |
| [I'm sorry] No one is available to take your call right now | Unknown |
| [I'm sorry] That is an invalid entry Unknown | |
| [I'm sorry] That is an invalid input Unknown | |
| [I'm sorry] do not recognize that input | Unknown |
| [I'm sorry] do not recognize that command | Unknown |
| [I'm sorry] That selection is not available | Unknown |
| [I'm sorry] That option is not available | Unknown |
| You have reached our automated system | Unknown |
| If you would like to use our automated System | Unknown |
| If you wish to use our automated system | Unknown |
| Our business hours are from | Unknown |
| One moment please while I transfer your call | Unknown |
| One moment please while I transfer you to an operator | Unknown |
| One moment please while I transfer you to an operator | Unknown |
| One moment please while I transfer you to the front desk | Unknown |
| Please wait while I transfer your call | Unknown |
| Please wait while I transfer you to an operator | Unknown |
| Please hold while I transfer you to an operator | Unknown |
| Please wait while I transfer you to the front desk | Unknown |
| Please hold while I transfer you to the front desk | Unknown |
| Please stay on the line while I transfer you to an operator | Unknown |
| Please remain on the line while I transfer you to an operator | Unknown |
| Please while I transfer you to the front desk | Unknown |
| Please stay on the line while I transfer you to the front desk | Unknown |
| Please remain on the line while I transfer you to the front desk | Unknown |
| Please hold for the Operator | Unknown |
| Please hold for the Attendant | Unknown |
| If you know the extension you wish to reach [please] dial it now | Unknown |
| If you know your party's extension [please] dial it now | Unknown |
| You may dial your parties extension now | Unknown |
| If you know your party's extension [please] enter it now | Unknown |
| How can I direct your call | Unknown |
| How may I direct your call | Unknown |
| Please wait | Unknown |
| Please hold | Unknown |

For example, Grammar 1 has 21 potential utterances that would make it an unknown. An unknown is something that is most likely an IVR call director automated device. Examples of a call director (or any other automated voice response device) response would be, "if you would like to use", "one moment please", business hours", please wait", please hold", "stay on the line", "remain on the line", "if you know your party's extension", "to reach a department", "transfer your call", "how can I direct your call", etc. Examples of answering machine type grammar or phrases that would be in the grammar are "please leave a message", "leave your message", "leave a short message", "leave your number", "leave your name and number", "you've reached the voice mail of", "this is the voice mail of", "you've reached my answering machine", etc.

Grammar 2, is directed to the situation where a DTMF zero is sent by the calling system as part of an attempt to illicit a response from a called line. So, when a zero is sent, the system might hear, "no attendant available", "one moment please", "please wait", "please hold," "stay on the line," "transferring you," "I'll connect you," or "front desk." The reason these are in phrases is because the actual sentence could be long, such as, "Please sty on the line while I connect you with the front desk." There is no need to recognize the entire sentence because key words are enough to yield contextually the answer. For example, the words "front desk" are not likely to appear on an answering machine message. Thus, by narrowing down the context, by proactive dialing of a zero, the system received more information than it otherwise would have.

Grammar 2 may also be directed to the situation where speech is output by the system as above, for the purpose of illiciting a response from a called line. As automated answering systems adopt speech recognition capabilities, DTMF might at some point no longer be a recognized method for interacting with such systems. As a result, alternative interrogations would be used, and the most obvious would be speech. For example in place of outputting a DTMF "0" the calling system might say "operator."

Figure 3:
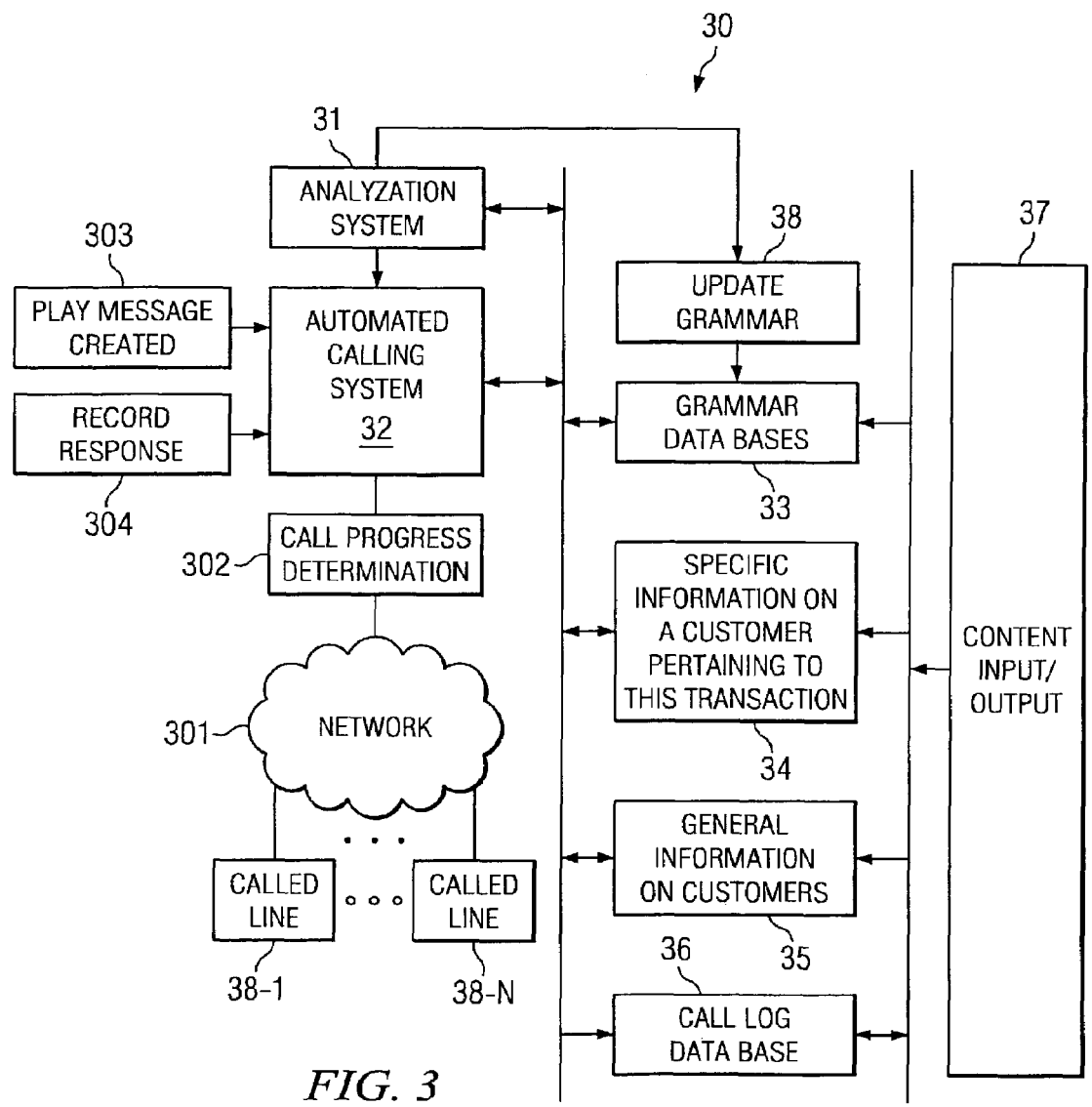
FIG. 3 is one embodiment of an automated calling system.

One of the processes involved in making this an efficient tool is to capture samples of what happens when a call is made. This allows the system to keep building its grammars to make it more and more efficient because the sample size is statistically larger. Such a grammar builder is shown in FIG. 3. The system actually teaches itself its various grammars and protocols. It starts off with a set of guesses and then records everything that goes on. If the system starts finding out that there are a large number of answering machines that say something off-beat such as "If you are trying to sell me something, go away", the system could put this phrase in the grammar for answer machines detection purposes. Similarly, with call directions, as they change in content so will the calling system. This adaptation process raises the accuracy of the system. Eventually, the calling system gets to the point where the incremental improvements are low enough to stop added grammar. With this approach, natural language understandings are used, as opposed to, or in addition to, predefined templates.

A system as described above, could be used for automated call back for order verification purposes. For example, if a person places an order, the calling system could place an automated call back to the number given by the person (or to a number in the system associated with the person, or associated with a credit card used by the order placer) and the calling system could verify that the call-back was answered, or whether a message was left on an answering machine, or with an attendant. Voice recognition could be used to verify that a person having the same name as the order places (or credit card holder) answers the phone, either live or by recorded message. Thus, if a "Jane Smith" places an order and gives her phone number as XYZ, sometime later, the automated calling system could place a call to number XYZ and, using the techniques discussed above, identify if a Jane Smith is at that address. Thus, if an answer machine answers and says, "This is the residence of John Doe, please leave a message", the system could signal that the order might have been placed improperly. If a live answer had occurred and the answering party said "No" when asked if he/she was Jane Smith, the system would tag the order as doubtful. By using grammars that include voice prints and other data, even more sophisticated verification systems could be used.

FIG. 3 shows one embodiment of an automated calling system 30 in which calls are placed to called lines 38-1 and 38-N via one or more networks 301 under control of system 32. Typically, a company (or more than one company when system 30 is used in a calling service bureau) would provide a database of information via content input 37. This information, for example, could be named and phone number to be called plus order number, delivery time, etc. This information then goes to the proper databases 33, 34, or 35.

At the proper time, a record is assembled from the various databases and presented to system 32 to place a calling connection to a target line, such as to line 38-1. After a determination is made via call progress determination circuit 302 that the call has been answered, analyzation system 31 begins the process described above with respect to FIGS. 1 and 2, distinguish between live, answer machine call director and possibly other answer possibilities. Under control of system 31, grammar base 33, working in cooperation with other data, such as from databases 34 and 35, probe the called line. At this point the probe could include a message from play message circuit 303 as controlled by system 31. When necessary, the grammars can be updated from actual calls via circuit 38.

When a message has been delivered (or aborted) the known information pertaining to the call, including any recordings made, via recordings 304, of responses recorded from the calling line, is logged in database 36 for subsequent use by a customer via input/output 37. Also, the data could be distributed over any data channel, for example using HTTP, XML, SMTP, SNMP, etc.

Note that system 30 is illustrative only, and any number of configurations can be used. The database or other data source or platform can be combined or further split apart as desired and any of he subsystems and circuitry can be activated, combined, or split apart as desired. Also, while the illustration discussed voice calls over a telephone network, the concepts discussed herein could apply to data calls over a telephone network, or voice and/or data calls over other networks, such as the Internet (IP Telephony or Voice over IP-VoIP). When using data, voice recognition would be replaced by data characteristic recognition, for example, bit length, word organization, error code detection, or the like.

Note that the concept of grammars, as discussed herein, include adapted natural language or other advanced speech recognition processes, as well as the grammar types discussed above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An automatic calling system comprising:
   means for using voice recognition for analyzing the contents of detected voice response on a called line, and wherein said analyzing means comprises at least one grammar updated based on captured samples;
   means for controlling the operation of said automatic calling system dependent upon said content analyzing;
   means for sending a message to a called line having detected voice thereon concurrently with using said voice recognition for analyzing said detected voice contents; and
   means for adjusting said grammars depending upon the nature of said response including the lack of any response.

2. The system of claim 1 wherein said analyzing means includes:
   means for probing said called line to elicit further information for voice recognition analyzation.

3. The system of claim 2 wherein said means for probing is designed to elicit specific recognizable responses if said voice is originating in real-time from a person answering said called line.

4. The system of claim 2 wherein said means for probing includes:
   an identification of at least one person associated with said called line.

5. The system of claim 1 wherein said controlling means includes:
   means for leaving at least one message, said message timed for delivery dependant upon said analyzation.

6. The system of claim 1 wherein said analyzing means includes at least one grammar preconditioned to a particular type of possible answer device associated with said called line.

7. The system of claim 6 wherein said grammar includes phrases for identifying call directors used as initial answer devices.

8. The system of claim 7 further including:
   means for further probing said called line if a call director is determined to be an answering device on said called line.

9. The system of claim 7 further including:
   means for further interacting with said called line, if a call director or automated voice response system is determined to be an answering device on said called line so as to achieve a predetermined outcome.

10. The system of claim 8 wherein said last-mentioned probe includes:
    sending DTMF tones as calling numbers.

11. The system of claim 8 wherein said last-mentioned probe includes:
    sending speech patterns over said called line.

12. The system of claim 6 wherein said grammar is updated from time to time based on actual messages received.

13. The system of claim 6 wherein additional grammars may be added to adapt to emerging scenarios affecting how calls are answered.

14. The system of claim 1 wherein said analyzing means includes:
    means for determining if detected voice is from an automated answering system; and
    means for interacting on said called line with said answering system to operate said answering system.

15. The system of claim 1 wherein said controlling means includes:
    means for controlling the operation of a detected automated answering device.

16. The system of claim 1 wherein said analyzing means includes:
    grammars for identifying automated voice response systems used as initial answer devices; and
    means for interacting with detected ones of said automated response systems.

17. A method for automatically placing telephone calls, said method comprising:
    placing calls to telephone lines;

determining if an answer has occurred on a particular called line;

playing a message to answered ones of said lines;

receiving from said answered lines responses to said messages;

analyzing any response from said called line using voice recognition based on expected grammars;

taking further action with respect to said called line dependent, at least in part, by analyzed ones of said responses, wherein said taking further action comprises changing the message being played on said called line; and adjusting said grammars depending upon the nature of said response including the lack of any response.

18. The method of claim 17 wherein said further action includes:

logging the results of said analyzed ones of said responses into a database.

19. The method of claim 17 wherein said further action includes:

distributing the information gained from said analyzing via data distribution channels.

20. The method of claim 17 wherein said further actions includes further interactions with said called line.

21. The method of claim 17 wherein said further interactions includes bi-directional automated responses.

22. A method for providing automated calling services, said method comprising:

obtaining a number to be called, said number having associated therewith at least one identifying characteristic, said identifying characteristic comprising specific information pertaining to the called party other than a telephone number of the called party;

placing a call to said number;

automatically determining call progression, with respect to a called number, where said automatically determining call progression is capable of determining no answer, live answer, answering machine answer, and call director answer, and wherein said automatically determining call progression uses at least one grammar updated based on captured samples;

storing in a database said determined call progression; and playing a message to an answered call, said message having one or more of said identifying characteristics associated with said called number;

recording at least a portion of any answer received from a called number; and storing said recording in said database along with said determined call progression.

23. The method of claim 22 further comprising: transmitting said recording to another system.

24. A system providing automated calling services, said system comprising:

means for obtaining a number to be called, said number having associated therewith at least one identifying characteristic;

means for placing a call to said number;

means for recording at least a portion of any answer received from a called number;

means for automatically determining call progression, with respect to a called number, where said automatically determining call progression is capable of determining no answer, live answer, answering machine answer, and call, director answer, and wherein said automatically determining call progression uses at least one grammar updated based on captured samples;

means for storing said recording in a database along with said determined call progression; and means for response recognition with respect to a called number, wherein said means for response recognition is based on grammars specific to the called number.

25. The system of claim 24 further comprising:

means for playing a message to said live answer party upon a determination of a live answer, said message being unique to said called line.

26. The system of claim 24 wherein said determining means includes:

means for playing a message having within it one or more means for identifying characteristics associated with said called number.

27. The system of claim 24 wherein said determining means includes:

means for sending to an answered call a message containing at least one said identifying characteristic; and means for matching any response received from a called line in response to sent ones of said identifying characteristic against predicted responses, said predicted responses tailored, at least in part, to said called number.

28. A method for providing automatic calling, said method comprising:

analyzing the contents of detected voice response on a called line by voice recognition techniques, wherein said techniques use at least one grammar updated based on captured samples;

probing said called line to elicit further information for voice recognition analyzation, said probing identifying at least one person associated with said called line;

controlling the operation of said automatic calling system dependent upon said content analyzing; and adjusting said grammars depending upon the nature of said response including the lack of any response.

29. The method of claim 28 wherein said probing is designed to elicit specific recognizable responses if said voice is originating in real-time from a person answering said called line.

30. The method of claim 28 wherein said controlling includes:

leaving at least one message, said message timed for delivery dependant upon said analyzation.

* * * * *